United States Patent [19]

Gotoh

[11] 4,264,101

[45] Apr. 28, 1981

[54] STRUCTURE OF A FORWARD BODY OF AN AUTOMOTIVE VEHICLE

[75] Inventor: Yoh Gotoh, Tokorozawa, Japan

[73] Assignee: Nissan Motor Company, Limited, Kanagawa, Japan

[21] Appl. No.: 90,686

[22] Filed: Nov. 2, 1979

[30] Foreign Application Priority Data

Nov. 10, 1978 [JP] Japan .................. 53-138470

[51] Int. Cl.³ .......................................... B62D 21/00
[52] U.S. Cl. ..................................... 296/194; 296/189
[58] Field of Search ............. 296/185, 189, 187, 194, 296/193, 198

[56] References Cited

U.S. PATENT DOCUMENTS

| 2,362,077 | 11/1944 | Ledwinka | 296/198 |
| 2,654,634 | 10/1953 | Zummach | 296/194 |
| 3,044,822 | 7/1962 | Dean | 296/194 |
| 3,086,606 | 4/1963 | Schwiering | 296/194 |
| 3,423,122 | 1/1969 | Wessells | 296/185 |
| 3,596,978 | 8/1971 | Wessells | 296/194 |

FOREIGN PATENT DOCUMENTS

| 2628104 | 1/1977 | Fed. Rep. of Germany . |
| 1110093 | 2/1956 | France . |
| 1456945 | 9/1966 | France . |
| 2271105 | 12/1975 | France . |

Primary Examiner—Robert R. Song
Attorney, Agent, or Firm—Lowe, King, Price & Becker

[57] ABSTRACT

A structure of a forward body of an automotive vehicle comprises opposite inverted substantially L-shaped connection members provided on corresponding upper ends of opposite hood ledge panels, respectively, the opposite connection members extending forward from the cowl top. Opposite shorter branches, or horizontal top portions, of the L's face inward toward each other and are connected at their widthwise ends to opposite suspension panels, respectively. The opposite longer branches, or vertical wall portions, of the L's are connected at their lengthwise inner end portions to corresponding sides of the cowl top and through corresponding side dash panels to corresponding front pillars, respectively. The connection members are easily crushed lengthwise upon collision, thereby preventing the front pillars from tilting into the passenger compartment.

6 Claims, 7 Drawing Figures

STRUCTURE OF A FORWARD BODY OF AN AUTOMOTIVE VEHICLE

BACKGROUND OF THE INVENTION

The present invention relates to a structure of a forward body of an automotive vehicle, and more particularly to a side structure of the forward body of the vehicle.

Referring to FIGS. 1, 2 and 3 of the accompanying drawings, there is shown a structure of a forward body of a prior art automotive vehicle. An engine compartment has two opposite side walls each of which is formed from a hood ledge panel 2. This panel 2 has a substantially horizontal widthwise inwardly extending suspension holder panel 3 and a substantially vertical reinforcing member 4 joined thereto so as to support, through the panel 3, a struct-type suspension, an engine, a transmission and other relative elements not shown in the figures in cooperation with the opposite hood ledge panel 2. In order to further reinforce the support structure, two opposite U-shaped cross-sectional forward side members 5, extending lengthwise along each side of the forward vehicle body, are respectively joined to the inside surfaces of the lower side portions of hood ledge panels 2 to form box-like cross-sectional reinforcements $S_1$ which are connected to corresponding side sills as a reinforcing member (not shown). Further, two opposite inverted substantially L-shaped cross-sectional connection members 6, extending lengthwise along each side of the forward vehicle body, are joined on the sides of two opposite front fenders 7 to two corresponding inverted substantially L-shaped cross-sectional portions 2a formed on upper-end portions of hood ledge panels 2 so as to form box-like cross-sectional reinforcements $S_2$ which are connected at their lengthwise inner ends to corresponding front pillars 8 and/or cowl top 9 each of which has a substantially box-like cross-section.

Since the opposite box-like cross-sectional reinforcements $S_1$ are connected to the corresponding side sills extending lengthwise along corresponding lower side portions of the vehicle body, as mentioned above, a load created on collision will be transmitted to the side sills and borne by same and cross members connected to the side sills so as to absorb the load efficiently. On the other hand, both the box-like cross-sectional reinforcements $S_2$ are connected to the corresponding front pillars thereby providing sufficient strength against a load acting on the reinforcement $S_2$ from the front. The load is borne by the front pillars 8 which prevent easy crushing of the upper portions of panels 2. As a result, the front pillars 8 are forced to tilt into the passenger compartment, reducing its inside space as well as failing to absorb the load effectively.

The box-like cross-sectional reinforcements $S_2$ formed on the upper end portions of the hood ledge panels 2 are shown as being connected at their lengthwise ends to the surfaces of the front pillars 8 and/or the cowl top 9. However, this connection is not easy due to the fact that additional flanges or the like must be provided on the ends of the reinforcements $S_2$ so as to establish a secure joint to the front pillars 8 and/or the cowl top 9.

As will be obvious from the above, the FIG. 3 structure is built by the following steps: the panel 3, the reinforcing member 4 and a gusset plate 10 are joined or assembled into a sub-assembly; this sub-assembly is welded or joined to the hood ledge panel 2; and the connection member 6 is welded to the upper end portion of the panel 2. This method requires relatively many welding steps due to the fact that the connection member 6 must be spot welded at both sides at many spots distributed throughout the whole length of the member 6.

The use of connection member 6 extending lengthwise of the forward body increases the weight of the vehicle.

SUMMARY OF THE INVENTION

It is therefore an object of the present invention to provide a structure of a forward body of an automotive vehicle in which opposite connection members provided on corresponding upper ends of corresponding hood ledge panels are sufficiently strong and rigid under safe-driving conditions and easily crushed on collision so as to prevent corresponding front pillars from tilting into the passenger compartment.

Another object of present invention is to provide a structure of a forward body of an automotive vehicle in which opposite connection members provided on upper ends of corresponding hood ledge panels are easily connected to corresponding front pillars and cowl tops.

Still another object of the present invention is to provide a structure of a forward body of an automotive vehicle having reduced weight.

According to the present invention, there is provided a structure of a forward body of an automotive vehicle, comprising:

(a) two opposite hood ledge panels extending lengthwise along the body and defining both side walls of the body;

(b) two opposite front pillars disposed at the rear ends of the hood ledge panels, respectively, and defining both sides of a front shield;

(c) a cowl top extending between the two opposite front pillars and between the two opposite hood ledge panels, respectively;

(d) two opposite inverted substantially L-shaped cross-sectional connection members extending forward from the cowl top and provided on corresponding upper ends of the two opposite hood ledge panels, respectively, in widthwise inward facing relationship, each connection member having a substantially vertical wall portion connected to an upper end of a corresponding one of the hood ledge panels and a substantially horizontal top portion facing inwardly widthwise and connected to an upper end of the substantially vertical wall portion, each connection member being connected at one end to the cowl top and a corresponding one of the front pillars, and (e) two opposite suspension holder panels each connected to the substantially horizontal top portion of one of the connection members.

Other objects, features and advantages of the present invention will become more apparent from the following description of a preferred embodiment of the present invention when take in conjunction with the accompanying drawings which, however, are given for illustration only. None of the particular features of the embodiment described or of the drawings, are to be taken as in any way limitative of the present invention, as well as the extent of protection sought to be afforded by Letters Patent, is to be delimited solely by the accompanying claims.

DESCRIPTION OF THE PREFERRED EMBODIMENT

In the various figures, similar parts will be denoted by the same reference number and detailed repetitive descriptions will be omitted for the sake of brevity.

Figure 2:
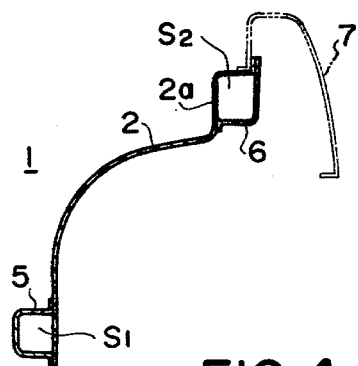
FIG. 2 is, as stated above, a cross-sectional view taken along line II—II in FIG. 1.
Figure 4:
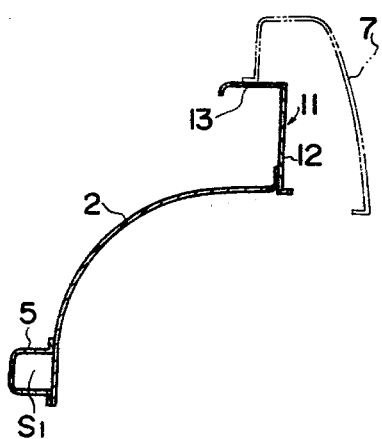
FIG. 4 is a view, similar to FIG. 2, of a forward body of an automotive vehicle according to the present invention.
Figure 5:
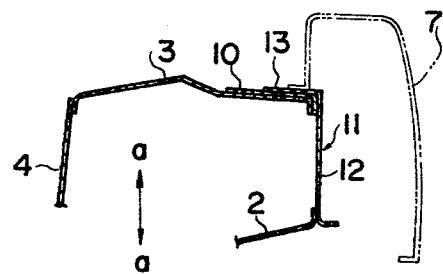
FIG. 5 is a view, similar to FIG. 3, of the forward body of the automotive vehicle according to the present invention.
Figure 6:
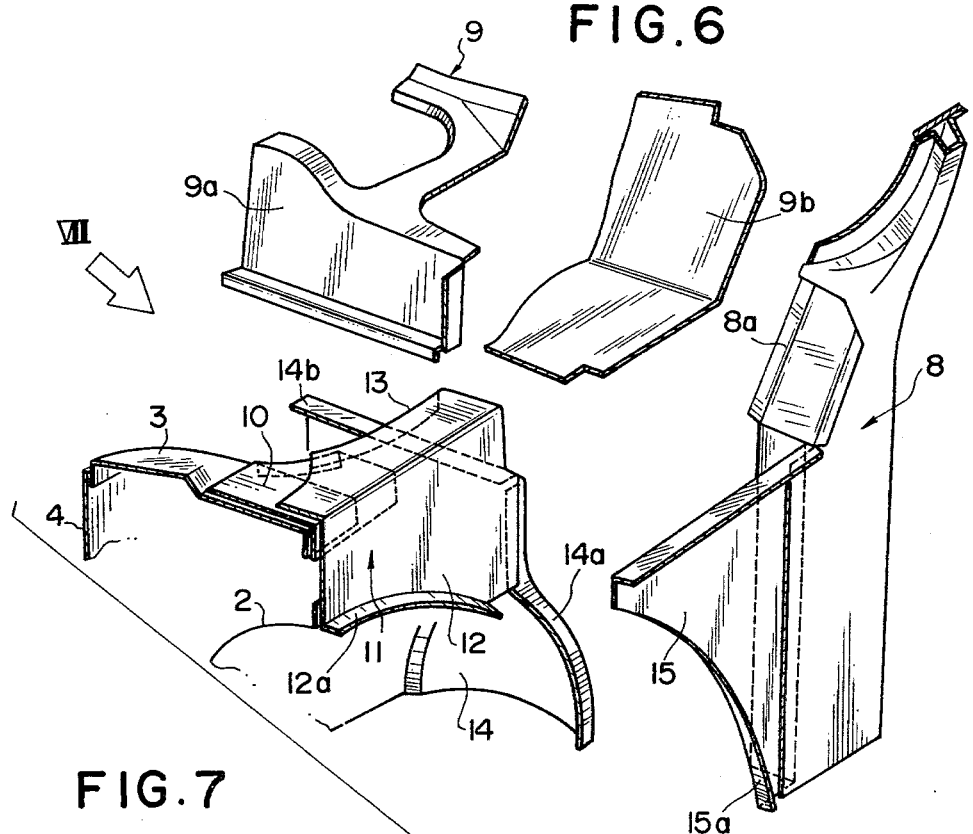
FIG. 6 is an exploded view of a fragmentary forward body of the automotive vehicle according to the present invention.
Figure 7:
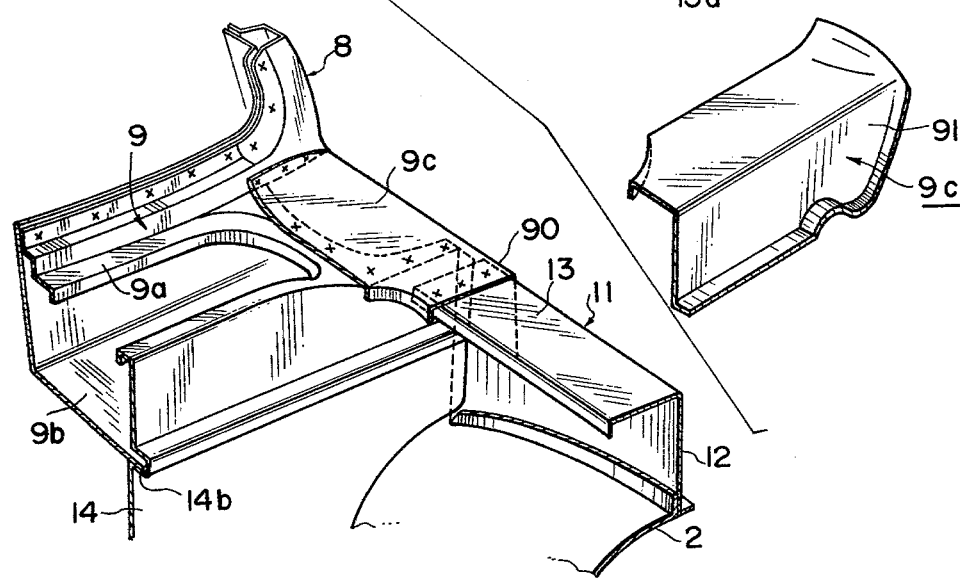
FIG. 7 is a perspective fragmentary view of the forward body assembled, as viewed in the direction of the arrow VII of FIG. 6.

Referring to FIG. 4, there is shown a preferred embodiment of a forward body of an automotive vehicle according to the present invention, similar to that shown in FIG. 2, showing one of two opposite symmetrical side structure of the vehicle forward body to avoid repetition. Two connection members 11, extending along either side of the forward body of the vehicle, are provided on upper end portions of corresponding hood ledge panels 2, respectively. Each connection member 11 consists of a substantially vertical wall portion 12 connected at its lower end to a corresponding hood ledge panel 2 and a substantially horizontal top portion 13 facing widthwise inwardly from an upper end of the wall portion 12. In this particular embodiment, though each connection member 11 is shown as a separate member joined to the upper end of panel 2, the former may be integral with the latter so as to form a one-piece member. Two opposite suspension holder panels 3, jointed to corresponding reinforcing members 4, are each spot-welded through a gusset member 10 to a lower surface of a horizontal top portion 13, as shown in FIG. 5. In some cases the gusset member 10 may be omitted. The rear edge of each connection member 11 is, as shown in FIGS. 6 and 7, connected as by spot-welding in overlapping relationship to a partially complementary horizontal top portion 90 of a substantially L-shaped side cowl top panel 9c connectedly covering an opening, not shown, in the side of cowl top 9. Each vertical wall portion 12 is connected to a side surface 91 of side cowl top panel 9c and a side flange 14a of a dash panel 14 in overlapping relationship and, further, through a side dash panel 15 to a corresponding front pillar 8. The flange 14a is connected to the inner surface of the side dash panel 15. The flange 12a of the vertical wall portion 12 is overlapped on, and joined to, the flange 15a of the side dash panel 15.

The cowl top 9 is composed of substantially L-shaped upper panel 9a, a substantially L-shaped lower panel 9b and opposite side cowl panels 9c, lower panel 9b being joined at each side end to a flange 8a of a corresponding front pillar 8 and to an upper end flange 14a of a corresponding dash panel 14. In FIG. 7, the inner curved edge portion of the horizontal top portion 13 of the connection member 11 is not shown for brevity of illustration.

As disclosed hereinbefore, each upper connection member 11 is connected at its horizontal top portion 13 and vertical wall portion 12 to cowl top 9 and front pillar 8 as reinforcing members, respectively, so that the vehicle body is provided with sufficient rigidity under safe-driving conditions. Force acting on the strut-type suspension, as shown by the arrows a in FIG. 5, is borne by the vertical wall portions 12 of connection members 11 in the direction of extension of the vertical plane of the wall portions 12 without bending the plane. The force acting upon the vertical wall portions 12 is in turn borne by front pillars 8 and cowl top 9. On the other hand, a transverse load is borne by the horizontal top portions 13 and then shared by cowl top 9 and front pillars 8 so that sufficient rigidity for support of the suspensions results.

Figure 3:
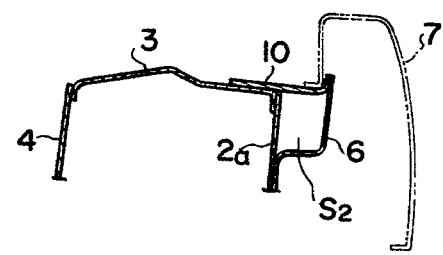
FIG. 3 is, as stated above, a cross-sectional view taken along line III—III in FIG. 1.

On collision, two opposite connection members 11 are easily crushed lengthwise of the vehicle body due to the fact that they have no box-like cross-sectional reinforcements such as used in the structure of FIGS. 2 and 3. This serves to prevent front pillars 8 from being forced to tilt into the passenger compartment thereby not injuring passengers therein.

Figure 1:
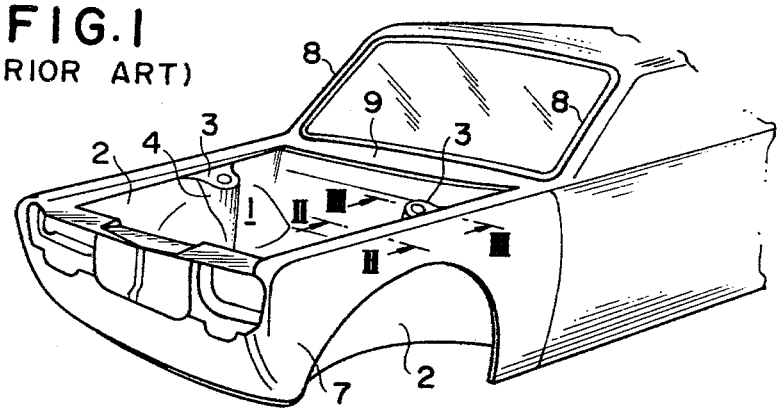
FIG. 1 is, as stated above, a perspective view of a forward body of a prior art automotive vehicle.

Assembly of the vehicle body structure shown in FIGS. 4 to 7 requires less time and less labor than that of the structure shown in FIGS. 1 to 3 in that the former does not involve any throublesome connection or welding of the ends of the box-like cross-sectional reinforcements $S_1$ to the front pillars having a box-like cross-sectional structure, such as involved in the latter. The connection of the horizontal top portions 13 and vertical wall portions 12 of connection members 11 to the top portion of cowl top 9 and side surfaces of front pillars 8 is easy due to the fact that it is effected at their overlapping relatively wide areas compared with the FIGS. 2 and 3 structure in which the box-like cross-sectional reinforcements are joined at their ends to the surfaces of front pillars 8 and cowl top 9.

The structure of the vehicle forward body according to the present invention does not require, at upper ends of the hood ledge panels 2, the provision of box-like cross-sectional reinforcements extending lengthwise of the vehicle body, such as shown by reference characters $S_2$ in FIGS. 2 and 3, thereby reducing the weight of the vehicle body.

Although the present invention has been shown and described in terms of the preferred embodiment thereof, the exact details of the embodiment are subject to various modifications, changes and/or omissions, by a person of ordinary skill in the art, depending upon the foregoing disclosure, without departing from the scope or the spirit of the present invention. Therefore it is desired that the aforesaid scope, as well as the breadth of the monopoly protection granted, should be defined, not by any of these purely fortuitous details of the shown embodiments, or of the drawings, but solely by the appended claims, which follow.

What is claimed is:

1. A structure of a forward body of an automotive vehicle, comprising:
    (a) two opposite hood ledge panels extending lengthwise along said body and defining either side wall of said body;

(b) two opposite front pillars disposed at the rear ends of said hood ledge panels, respectively, and defining both sides of a front shield;

(c) a cowl top extending between said two opposite front pillars and between said two opposite hood ledge panels, respectively;

(d) two opposite inverted substantially L-shaped cross-sectional connection members extending forward from said cowl top and provided on corresponding upper ends of said two opposite hood ledge panels, respectively, in widthwise inward facing relationship, each connection member having a substantially vertical wall portion connected to an upper end of a corresponding one of said hood ledge panels and a substantially horizontal top portion facing inwardly widthwise and connected to an upper end of said substantially vertical wall portion, each connection member being connected at one end to said cowl top and a corresponding one of said front pillars, and (e) two opposite suspension holder panels each connected to the substantially horizontal top portion of one of the connection members.

2. A structure according to claim 1, wherein said cowl top includes, on either end thereof, two opposite substantially L-shaped side members each connected at one end to a corresponding one of said front pillars, each said connection member being connected at one end to a corresponding one of said substantially L-shaped side members of said cowl top in overlapping relationship.

3. A structure according to claim 1 or 2, wherein each said connection member is further connected to a dash panel located therebelow.

4. A structure according to claim 3, further including a gusset plate disposed between said suspension holder panel and said substantially horizontal top portion of said connection member.

5. A structure according to claim 3, wherein said substantially horizontal top portion of each said connection member is at one end connected to said cowl top, and wherein said substantially vertical wall portion of said connection member is connected at one end to said cowl top and said dash panel.

6. A structure according to claim 5, wherein said front pillars have a side dash panel extending forward therefrom and wherein said substantially vertical wall portion of said connection member is connected through said side dash panel to a corresponding one of said front pillars.

* * * * *